US011320404B2

(12) United States Patent
Jeketo et al.

(10) Patent No.: US 11,320,404 B2
(45) Date of Patent: May 3, 2022

(54) APPARATUS AND A METHOD OF ULTRASONICALLY INSPECTING A COMPONENT

(71) Applicant: ROLLS-ROYCE plc, London (GB)

(72) Inventors: Alejandro Jeketo, Derby (GB); Michael Bowyer, Derby (GB); Joseph J. Corcoran, Orpington (GB); Eli Leinov, London (GB)

(73) Assignee: Rolls-Royce PLC, London (GB)

( * ) Notice: Subject to any disclaimer, the term of this patent is extended or adjusted under 35 U.S.C. 154(b) by 201 days.

(21) Appl. No.: 16/740,859

(22) Filed: Jan. 13, 2020

(65) Prior Publication Data
US 2020/0249207 A1   Aug. 6, 2020

(30) Foreign Application Priority Data

Feb. 5, 2019 (GB) ..................... 1901551

(51) Int. Cl.
*G01N 29/24* (2006.01)
*G01N 29/22* (2006.01)
(Continued)

(52) U.S. Cl.
CPC ....... *G01N 29/2462* (2013.01); *G01N 29/225* (2013.01); *G01N 29/265* (2013.01);
(Continued)

(58) Field of Classification Search
CPC .............. G01N 29/2462; G01N 29/225; G01N 29/265; G01N 29/343; G01N 29/346;
(Continued)

(56) References Cited

U.S. PATENT DOCUMENTS

| 3,529,465 A | 9/1970 | Kleesattel et al. |
| 5,159,838 A | 11/1992 | Lynnworth |

(Continued)

FOREIGN PATENT DOCUMENTS

| EP | 3171166 | 5/2017 |
| JP | H06288996 | 10/1994 |

(Continued)

OTHER PUBLICATIONS

Response to Extended European Search Report from counterpart EP Application No. 20150780.3 dated Jul. 2, 2020, filed Feb. 12, 2021, 80 pgs.

(Continued)

*Primary Examiner* — Xin Y Zhong
(74) *Attorney, Agent, or Firm* — Shumaker & Sieffert, P.A.

(57) ABSTRACT

An apparatus for ultrasonically inspecting a component of a gas turbine engine at a centre frequency required for ultrasonic inspection of the component. The apparatus comprises an ultrasonic transducer and a waveguide. The ultrasonic transducer and the waveguide are mounted in a holder, the holder is movably mounted in a carrier, and the carrier is movably mounted in a frame. The waveguide has a first end, a second end and a surface. The waveguide is circular in cross-section, the surface of the waveguide between the first end and the second end is concave, and the waveguide reduces in diameter from the first end to the second end. The length of the waveguide is equal to or greater than 0.5 times and equal to or less than 3 times the wavelength of an ultrasonic signal at the centre frequency required for the ultrasonic inspection.

20 Claims, 11 Drawing Sheets

(51) Int. Cl.
*G01N 29/265* (2006.01)
*G01N 29/34* (2006.01)

(52) U.S. Cl.
CPC ......... *G01N 29/343* (2013.01); *G01N 29/346* (2013.01); *G01N 29/348* (2013.01); *G01N 2291/0289* (2013.01); *G01N 2291/101* (2013.01); *G01N 2291/2693* (2013.01)

(58) Field of Classification Search
CPC ......... G01N 29/348; G01N 2291/0289; G01N 2291/101; G01N 2291/2693; G01N 29/04; G10K 11/004
See application file for complete search history.

(56) References Cited

U.S. PATENT DOCUMENTS

| | | | |
|---|---|---|---|
| 5,280,724 A * | 1/1994 | Higo | G01N 29/24 310/336 |
| 5,400,788 A | 3/1995 | Dias et al. | |
| 9,880,133 B1 | 1/2018 | Stephanou | |
| 2009/0314088 A1* | 12/2009 | Djordjevic | G01N 29/11 73/602 |
| 2014/0305217 A1* | 10/2014 | Tapia | G01N 27/9013 73/618 |

FOREIGN PATENT DOCUMENTS

| | | |
|---|---|---|
| JP | H0821828 | 1/1996 |
| JP | 2015021742 | 2/2015 |
| SU | 1490620 | 6/1989 |
| WO | 2009152143 | 12/2009 |

OTHER PUBLICATIONS

European search report dated Jun. 23, 2020, issued in EP Patent Application No. 20150780.

Great Britain search report dated Jul. 11, 2019, issued in GB Patent Application No. GB1901551.0.

* cited by examiner

APPARATUS AND A METHOD OF ULTRASONICALLY INSPECTING A COMPONENT

CROSS-REFERENCE TO RELATED APPLICATIONS

This specification is based upon and claims the benefit of priority from United Kingdom patent application number GB 1901551.0 filed on Feb. 5, 2019, the entire contents of which are incorporated herein by reference.

BACKGROUND

Technical Field

The present disclosure relates to an apparatus and a method of ultrasonically inspecting a component and in particular to an apparatus and a method of ultrasonically inspecting an annular sealing fin on a turbine disc, or a compressor disc, of a gas turbine engine.

Description of the Related Art

The annular sealing fin on a turbine disc, or a compressor disc, of a gas turbine engine is coated with an abrasive material which is arranged to cut into an abradable material on a stationary component of the gas turbine engine when the gas turbine engine is in operation in order to form a seal.

It is necessary to inspect the annular sealing fin on a turbine disc, or compressor disc, to ensure that there are no cracks in the annular sealing fin. Any undetected cracks in the annular sealing fin may propagate into the turbine disc, or compressor disc, and render the turbine disc, or compressor disc, unusable. An annular sealing fin is difficult to inspect by conventional techniques because of the shape and the location of the annular sealing fin on the turbine disc, or compressor disc, because of adjacent components, e.g. integral turbine blades or compressor blades, mounted on the turbine disc, or compressor disc, and because of the abrasive material on the annular sealing fin. Conventional techniques include visual inspection using a microscope and fluorescent penetrant inspection, but these suffer from the problem that the abrasive material overlies the sealing fin and prevents the inspection of the surface of the sealing fin. Eddy current testing suffers from the problem that the abrasive material may absorb the eddy currents.

European patent application EP 3171166 A1 discloses an apparatus and method for ultrasonically inspecting component but requires an elongate connector between a transducer and a contact head placed in contact with the component and a detector to detect reflection of ultrasonic signals within the component.

A problem with the apparatus and method for ultrasonically inspecting component described in EP 3171166 A1 is that it requires an elongate connector, and the contact head has to be moved over the whole of the surface of the component to be inspected or a separate detector, e.g. a laser vibrometer, has to be used. The elongate connector for optimum performance theoretically should have a length of the order of the length of the circumference of the annular sealing fin on a disc, but this is about 1.25 metres, which is impractical. The elongate connector typically has a length of about 150 to 200 mm.

SUMMARY

According to a first aspect there is provided an apparatus for ultrasonically inspecting a component of a gas turbine engine at a centre frequency required for ultrasonic inspection of the component, the apparatus comprising an ultrasonic transducer and a waveguide; the ultrasonic transducer and the waveguide are mounted in a holder, the holder is movably mounted in a carrier, and the carrier is movably mounted in a frame; the waveguide has a first end, a second end and a surface, the waveguide is circular in cross-section, the surface of the waveguide between the first end and the second end is concave, and the waveguide reduces in diameter from the first end to the second end, the length of the waveguide being equal to or greater than 0.5 times and equal to or less than 3 times the wavelength of an ultrasonic signal at the centre frequency required for the ultrasonic inspection; and the ultrasonic transducer is acoustically coupled to the first end of the waveguide and the second end of the waveguide is arranged adjacent to the component in use.

The length of the waveguide may be equal to the wavelength of the ultrasonic signal at the centre frequency required for the ultrasonic inspection.

The first end of the waveguide may have a diameter equal to or greater than 0.3 times and equal to or less than 0.7 times the wavelength of the ultrasonic signal at the centre frequency required for the ultrasonic inspection, The first end of the waveguide may have a diameter equal to half the wavelength of the ultrasonic signal at the centre frequency required for the ultrasonic inspection.

The surface of the waveguide between the first end and the second end may be parabolic.

The waveguide may comprise a metal. The waveguide may comprise iron, steel, stainless steel, nickel, a nickel alloy or brass.

The ultrasonic transducer may have a centre frequency equal to or greater than 0.5 MHz and equal to or less than 3 MHz.

The ultrasonic transducer may have a centre frequency equal to or greater than 0.5 MHz and equal to or less than 2.25 MHz.

The ultrasonic transducer may have a centre frequency equal to or greater than 0.5 MHz and equal to or less than 1 MHz.

The ultrasonic transducer may have a centre frequency of 1 MHz. The ultrasonic transducer may have a centre frequency of 2.25 MHz.

The apparatus may further comprise a bandpass filter of 400 kHz to 600 kHz.

The second end of the waveguide may have a diameter of 0.4 mm, the first end of the waveguide having a diameter of 6 mm and the waveguide having a length of 12 mm.

The second end of the waveguide may have a bend. The second end of the waveguide may have a bend greater than 45°. The second end of the waveguide may have a bend greater than 60°. The second end of the waveguide may have a 70°, 80° or 90° bend.

The apparatus may further comprise a signal generator arranged to send a signal to the ultrasonic transducer.

The signal generator may be arranged to provide a signal with a centre frequency of 500 kHz, the signal having an amplitude of 20 to 800 V peak to peak and the signal is a 5 cycle tone burst.

The signal generator may have a pulse repetition rate of 15 Hz and a time base of 1000 μs.

The ultrasonic transducer and the waveguide are mounted in a holder, the holder is movably mounted in a carrier, and the carrier is movably mounted in a frame. The holder may be pivotally mounted in the carrier. The carrier may be slidably mounted in the frame.

The frame may be generally U-shape. The frame may have a handle. The frame may comprise two parallel limbs and each limb has a track upon which the carrier is movably mounted. The carrier may be movably mounted in a direction parallel to the limbs of the frame. The holder may be pivotally mounted to rotate about an axis perpendicular to the limbs of the frame.

The remote end of each limb of the frame may have a part cylindrical surface. The axis of the part cylindrical surface of each limb may be perpendicular to the length of the limb and perpendicular to a direction between the limbs. The remote end of each limb of the frame may have a projection extending from a first side of the limb and parallel to the limb to form an L-shape with the part cylindrical surface at the remote end of the limb, the projections are arranged in the same plane. Each projection may have a part spherical surface.

The frame may have a first mechanism to adjust the position of the carrier along the limbs of the frame. The first mechanism may comprise a wheel fixedly mounted on a cylindrical member. The opposite ends of the cylindrical member may be rotatably mounted in the frame and the axis of the cylindrical member is arranged perpendicular to the limbs of the frame. A pair of cams may be eccentrically mounted on the cylindrical member and the cams are located in recesses in the carrier and the cams abut the carrier. Rotation of the wheel produces rotation of the cylindrical member and hence causes the carrier to move longitudinally relative to the frame due to the cams on the cylindrical member acting on the longitudinally spaced sides of the recesses of the carrier. The carrier is moved longitudinally relative to the frame to accommodate different diameters of the sealing fin. The wheel may be a knurled wheel.

The carrier may have a second mechanism to rotate the holder in a first rotational direction around the pivotal mount, the carrier having a spring to bias the holder against rotation in the first rotational direction.

The second mechanism may comprise a wheel fixedly mounted on a cylindrical member. The opposite ends of the cylindrical member may be rotatably mounted in the carrier and the axis of the cylindrical member is arranged perpendicular to the limbs of the frame. The wheel may have a cylindrical rod arranged parallel to the axis of the cylindrical member and eccentrically mounted on one face of the wheel. A slider may be arranged in a track in the carrier, a first end of the slider has a U-shaped member and the second end of the slider has an angled surface. The cylindrical rod may locate in the recess defined by the U-shaped member and the holder has a pin arranged to abut the angled surface on the second end of the slider. The spring may act on the opposite side of the holder and the other limb. The wheel may be a knurled wheel.

The second mechanism may comprise a button mounted in the carrier and the button is connected by a lever to the pivotal mount. The carrier also has a spring to bias the button against rotation in a first rotational direction. The button may be depressed to cause the holder to pivot in the frame to move the second end of the waveguide out of contact with the sealing fin and the spring is provided to ensure that a good, repeatable contact between the second end of the waveguide and the sealing fin is achieved when pressure on the button is released.

An acoustic damper may be arranged in acoustic contact with the surface of the waveguide.

According to a second aspect there is provided a method of ultrasonically inspecting a component of a gas turbine engine, the method comprising the steps of: (a) providing an apparatus according to any preceding claim for ultrasonically inspecting a component of a gas turbine engine at a centre frequency required for ultrasonic inspection of the component, the apparatus comprising an ultrasonic transducer and a waveguide, the waveguide having a first end, a second end and a surface, the waveguide being circular in cross-section, the waveguide reducing in diameter from the first end to the second end, the length of the waveguide being equal to or greater than 0.5 times and equal to or less than 3 times the wavelength of an ultrasonic signal at the centre frequency required for the ultrasonic inspection, the ultrasonic transducer being acoustically coupled to the first end of the waveguide; (b) arranging the second end of the waveguide adjacent to the component; (c) transmitting an ultrasonic signal from the ultrasonic transducer through the waveguide into the component; and (d) detecting the reflected ultrasonic signal in the component using the waveguide and ultrasonic transducer.

The length of the waveguide may be equal to the wavelength of the ultrasonic signal at the centre frequency required for the ultrasonic inspection.

The component may be an annular member or a disc member.

The component may comprise a turbine disc, a turbine drum, a compressor disc, a compressor drum or a shaft.

The component may comprise an annular sealing fin on the turbine disc, an annular sealing fin on the turbine drum, an annular sealing fin on a compressor disc, an annular sealing fin on a compressor drum or an annular sealing fin on a shaft.

The annular sealing fin may have a coating. The coating may be an abrasive material.

The method may further comprise converting a longitudinal wave in the ultrasonic transducer to an edge mode wave at the second end of the waveguide.

The method may comprise allowing longitudinal waves, allowing edge mode waves and reducing other wave modes in the waveguide.

The edge mode wave may be an antisymmetric flexural edge mode wave.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft. In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges. Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
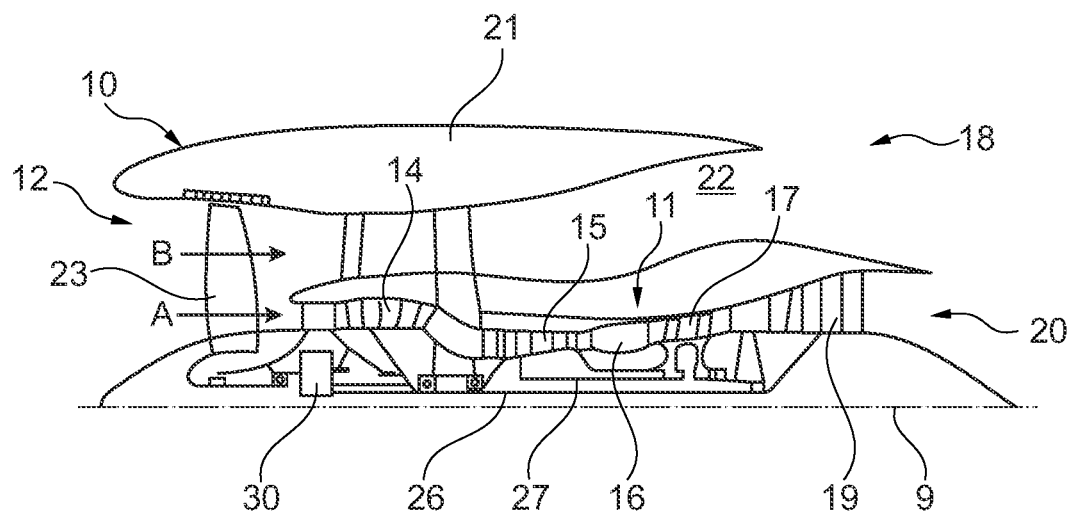
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
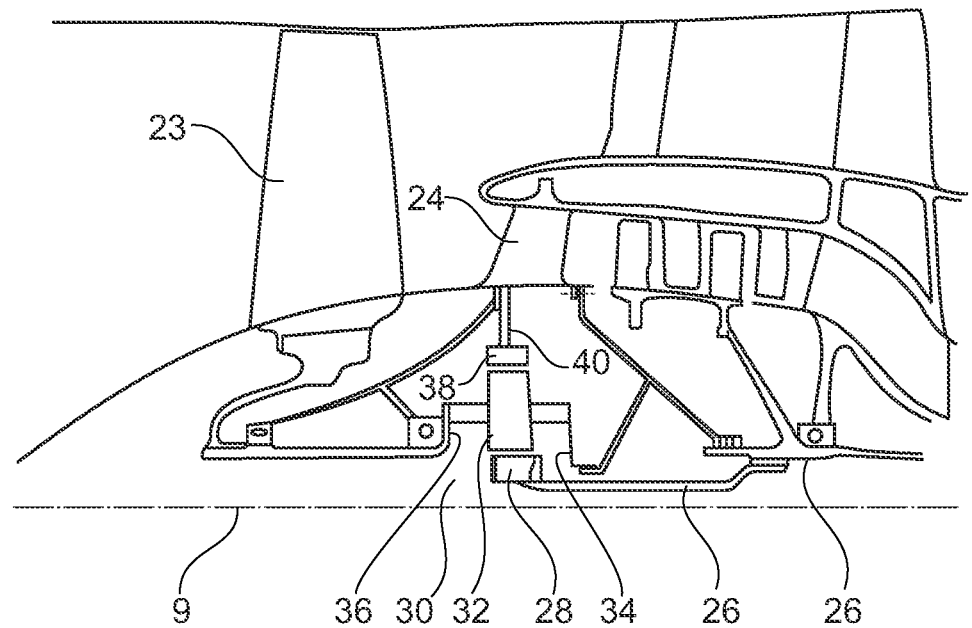
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
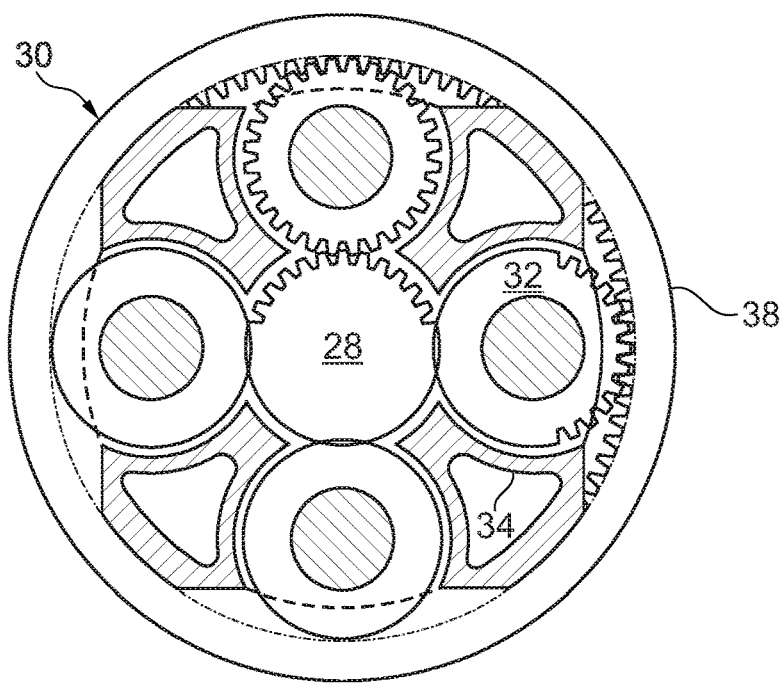
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
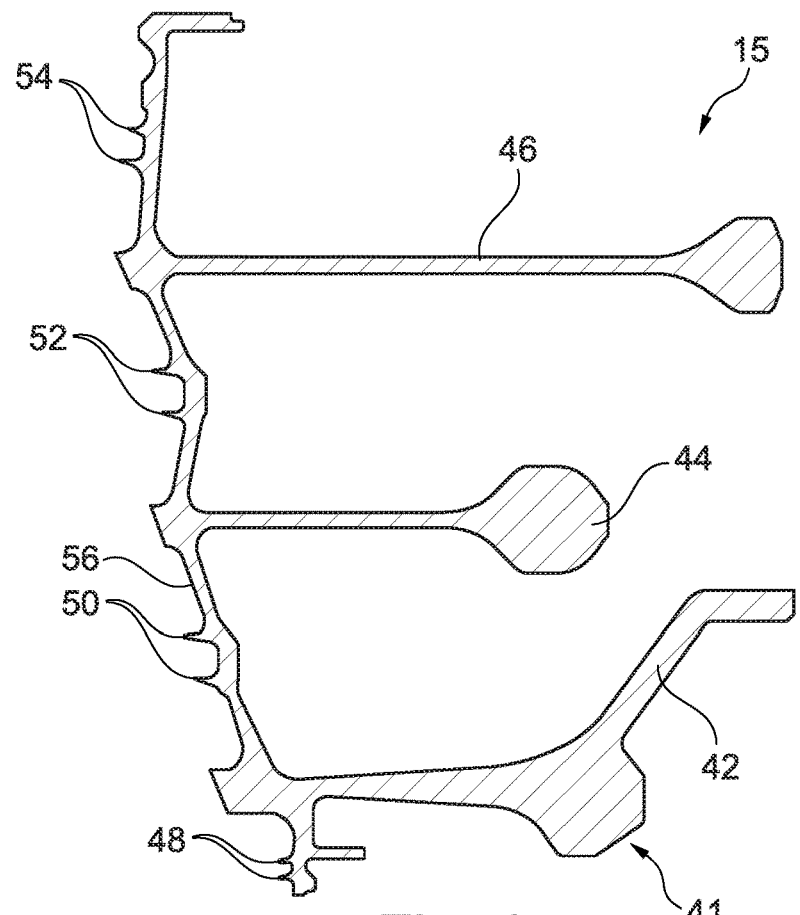
FIG. 4 is a sectional side view of a portion of a compressor of the gas turbine engine shown in FIG. 1.

FIG. 4 shows a cross section through the first three discs 42, 44, 46 of the compressor drum 41 of the high pressure compressor 15. Closely spaced sealing fins 48, 50, 52, 54 are provided on the radially outer surface 56 of the compressor drum 41 axially upstream of the first disc 42 and between the first, second and third discs 42, 44 and 46 respectively and axially downstream of the third disc 46. Due to their close spacing, it is difficult to introduce a contact probe or transducer to the sealing fins 48, 50, 52 and 54 directly in order to conduct an ultrasonic inspection of the sealing fins 48, 50, 52 and 54. The sealing fins 48, 50, 52 and 54 extend radially outwardly from the compressor drum 41. In this example there is a plurality of, for example two, sealing fins 48 axially upstream of the first disc 42 and a plurality of, for example two, sealing fins 50 and 52 between the first, second and third discs 42, 44 and 46 and a plurality of, for example two, sealing fins 54 axially downstream of the third disc 46.

Figure 5:
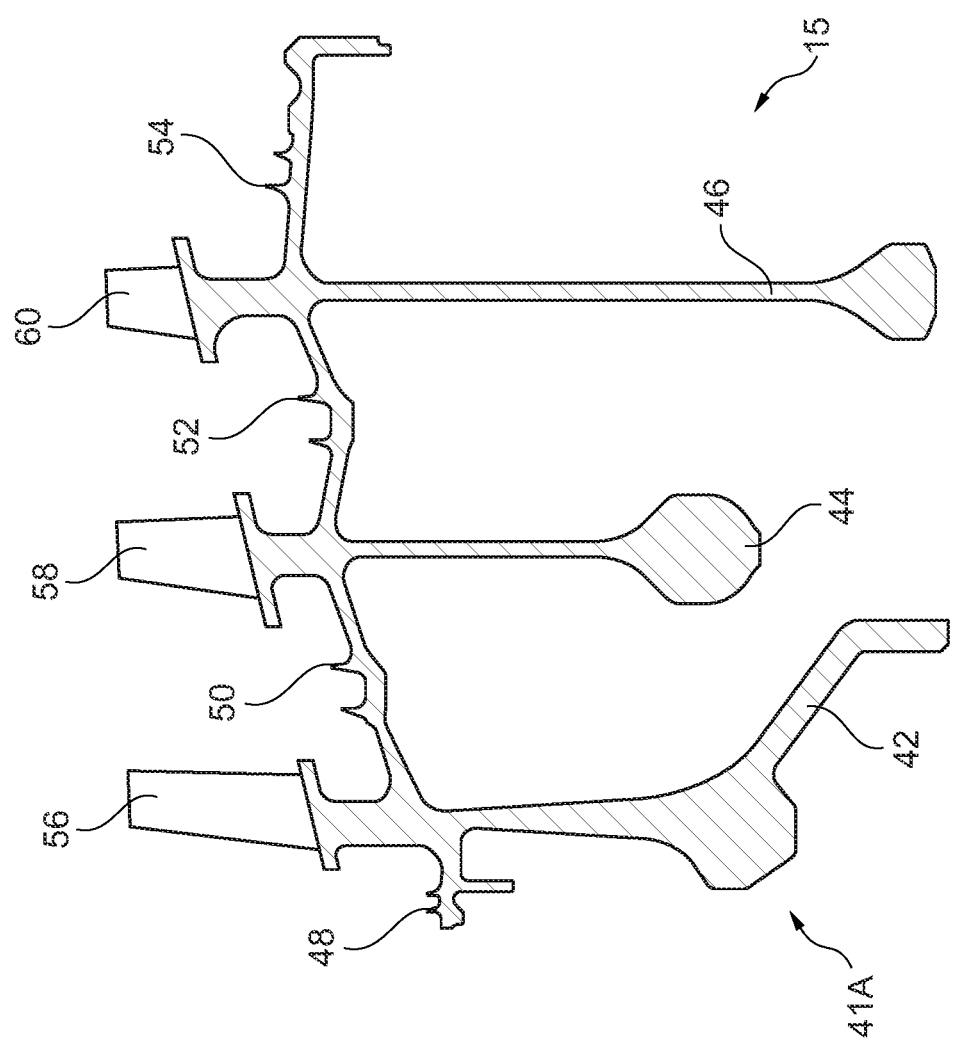
FIG. 5 is a sectional side view of a portion of an alternative compressor of the gas turbine engine shown in FIG. 1.

FIG. 5 shows a cross section through the first three discs 42, 44, 46 of an alternative compressor drum 41A of the high pressure compressor 15. The compressor drum 41A is similar to the compressor drum 41, and like parts are denoted by like numerals. Again there are closely spaced sealing fins 48, 50, 52, 54 are provided on the radially outer surface 56 of the compressor drum 41A axially upstream of the first disc 42 and between the first, second and third discs 42, 44 and 46 respectively and axially downstream of the third disc 46. Due to their close spacing, it is difficult to introduce a contact probe or transducer to the sealing fins 48, 50, 52 and 54 directly in order to conduct an ultrasonic inspection of the sealing fins 48, 50, 52 and 54. The sealing fins 48, 50, 52 and 54 extend radially outwardly from the compressor drum 41. In this example there is a plurality of, for example two, sealing fins 48 axially upstream of the first disc 42 and a plurality of, for example two, sealing fins 50 and 52 between the first, second and third discs 42, 44 and 46 and a plurality of, for example two, sealing fins 54 axially downstream of the third disc 46.

The compressor drum 41A differs in that it has integral blades 56, 58 and 60 arranged on the discs 42, 44 and 46 respectively. The integral blades 56, 58 and 60 are welded, or bonded, e.g. friction welded, linear friction welded or diffusion bonded, to the respective disc 42, 44 and 46 or are machined, e.g. milled or ground, from the same disc, the same metal disc, as the respective disc 42, 44 and 46. The integral blades 56, 58 and 60 make it even more difficult to introduce a contact probe or transducer to the sealing fins 48, 50, 52 and 54 directly in order to conduct an ultrasonic inspection of the sealing fins 48, 50, 52 and 54 and furthermore the integral blades 56, 58 and 60 have sharp leading edges, trailing edges and platforms which present a risk of damage to the hands of an inspector conducting an ultrasonic inspection of the sealing fins 48, 50, 52 and 54.

Figure 6:
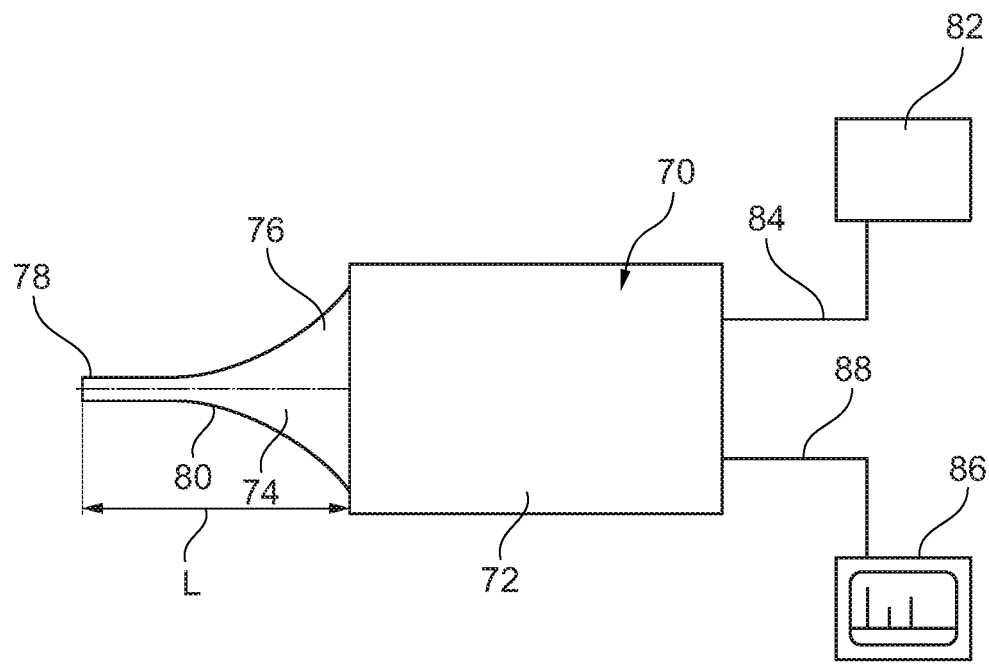
FIG. 6 is a schematic showing an apparatus for ultrasonically inspecting a component according to the present disclosure.

An apparatus 70 for ultrasonically inspecting a component according to the present disclosure is shown in FIG. 6. The apparatus 70 comprises an ultrasonic transducer 72 and a waveguide 74. The waveguide 74 has a first end 76, a second end 78 and a surface 80. The waveguide 74 is circular in cross-section and the waveguide 74 reduces in diameter from the first end 76 to the second end 78. The surface 80 of the waveguide 74 between the first end 76 and the second end 78 is concave. The geometry of the waveguide 74, e.g. the concave surface 80, reduces the prevalence of other wave modes that would interfere with defect detection. The length L of the waveguide 74 from the first end 76 to the second end 78 of the waveguide 74 is equal to the wavelength of the ultrasonic signal at the centre frequency required for the ultrasonic inspection. The ultrasonic transducer 72 is acoustically coupled to the first end 76 of the waveguide 74 and the second end 78 of the waveguide 74 is arranged adjacent to and abutting the component in use. The first end 76 of the waveguide 74 is bonded to the ultrasonic transducer 72 using a suitable low viscosity permanent adhesive. The surface 80 of the waveguide 74 between the first end 76 and the second end 78 is parabolic in this example, but other suitable shapes may be used. The waveguide 74 comprises a metal, for example the waveguide 74 may comprise iron, steel, stainless steel, nickel, a nickel alloy or brass. The waveguide 74 converts the longitudinal wave from the transducer 72 into an edge mode wave in the component. The edge mode wave may be an antisymmetric flexural edge mode wave.

The apparatus 70 further comprises a signal generator 82 arranged to send a signal to the ultrasonic transducer 72 via an electric cable 84 such that the ultrasonic transducer 72 transmits an ultrasonic signal into a component through the waveguide 74. The apparatus 70 also comprises a monitor 86 to display the ultrasonic signal transmitted into the component and the ultrasonic signal received by the transducer 72 after it has passed though, or around, the component and back through the waveguide 74 to the transducer 72 and the ultrasonic signal reflected back from a crack, or other defect, in the component and through the waveguide 74 back to the transducer 72. The monitor 86 is connected to transducer 72 via an electrical cable 88. The signal generator 82 and the monitor 86 may be conveniently provided in a single unit.

Figure 8:
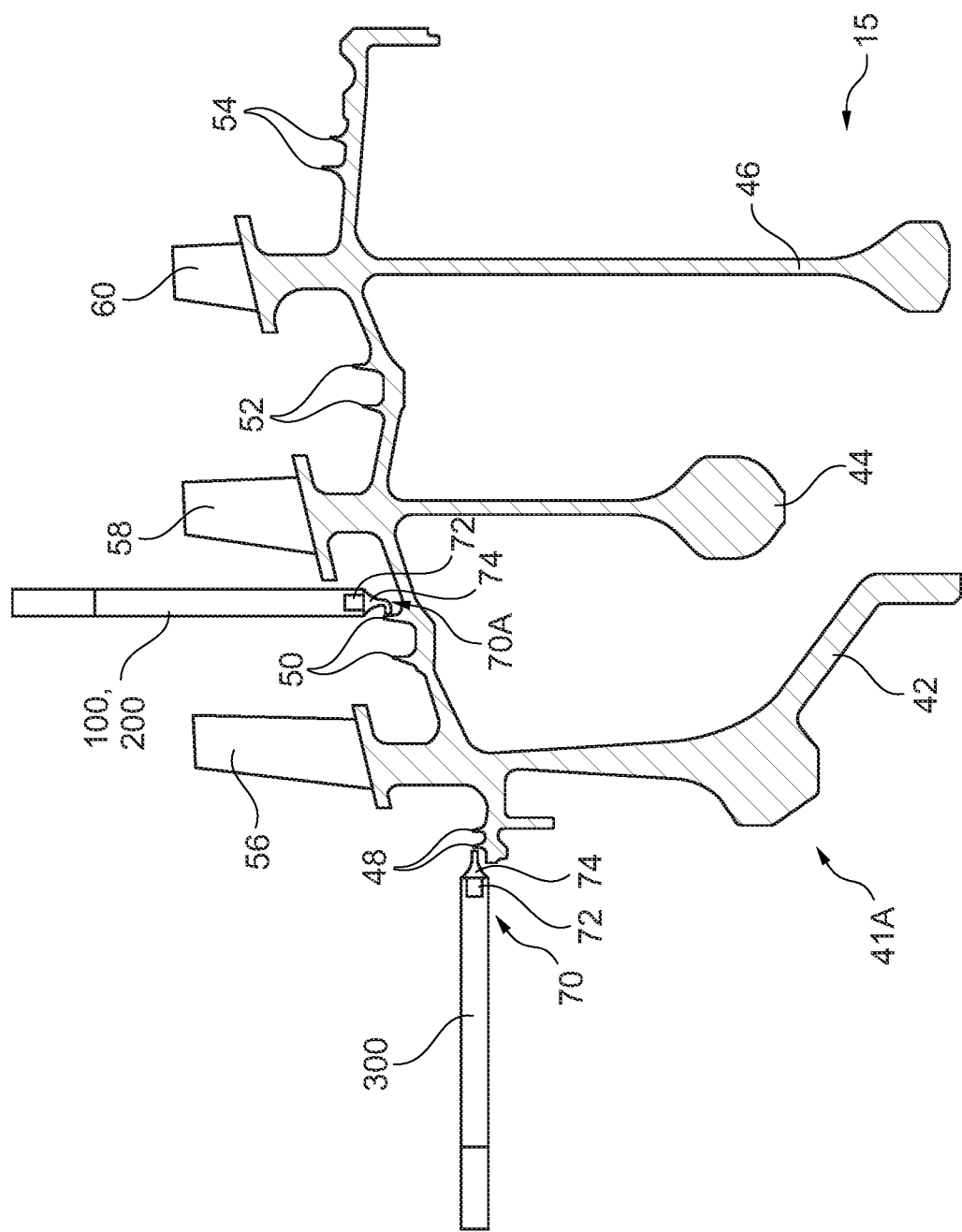
FIG. 8 is a sectional side view of a portion of an alternative compressor of the gas turbine engine shown in FIG. 5 and the apparatus for ultrasonically inspecting a component shown in FIG. 7.

The apparatus 70 is used to ultrasonically inspect a compressor drum 41, 41A and in particular to ultrasonically inspect a sealing fin 48, 50, 52 or 54 if a side surface, an annular radially extending surface, of the sealing fin 48, 50, 52 or 54 is accessible directly in an axial direction from the side, e.g. the flat surface at the second end 78 of the waveguide 74 may be placed against the side surface of the sealing fin 48, 50, 52 or 54, as shown in FIG. 8.

In one example the ultrasonic transducer has a centre frequency of 1 MHz and a bandwidth of 50. The second end 78 of the waveguide 74 has a diameter of 0.4 mm, the first end 76 of the waveguide 74 has a diameter of 6 mm and the waveguide 74 has a length L of 12 mm such that the waveguide 74 is arranged to transmit an ultrasonic signal of 500 kHz. The apparatus 70 further comprises a bandpass filter of 400 kHz to 600 kHz, this reduces undesired frequency content and noise. The signal generator 82 is arranged to provide a signal with a centre frequency of 500 kHz and the signal is a 5 cycle tone burst to produce the correct waveform, the signal has an amplitude of 20 to 800 V, e.g. 600 V, peak to peak to provide a sufficient ultrasonic signal within the component. The signal generator 82 has a pulse repetition rate of 15 Hz and a time base of 1000 μs, this is in order to allow the ultrasonic signal to traverse the full circumference of the component without superposition that would interfere with crack, or defect, detection.

In another example the ultrasonic transducer has a centre frequency of 2.25 MHz and a bandwidth of 50%. The second end 78 of the waveguide 74 has a diameter of 0.4 mm, the first end 76 of the waveguide 74 has a diameter of 6 mm and the waveguide 74 has a length L of 12 mm such that the waveguide 74 is arranged to transmit an ultrasonic signal of 500 kHz. The apparatus 70 further comprises a bandpass filter of 400 kHz to 600 kHz, this reduces undesired frequency content and noise. The signal generator 82 is arranged to provide a signal with a centre frequency of 500 kHz and the signal is a 5 cycle tone burst to produce the correct waveform, the signal has an amplitude of 400 to 800 V, e.g. 600 V, peak to peak to provide a sufficient ultrasonic signal within the component. The signal generator 82 has a pulse repetition rate of 15 Hz and a time base of 1000 μs, this is in order to allow the ultrasonic signal to traverse the full circumference of the component without superposition that would interfere with crack, or defect, detection. This example produced better signals from undamaged sealing fins 48, 50, 52 or 54 and damaged, cracked or other type of defective sealing fins 48, 50, 52 or 54 than the example an ultrasonic transducer which has a centre frequency of 1 MHz and a bandwidth of 50.

Figure 7:
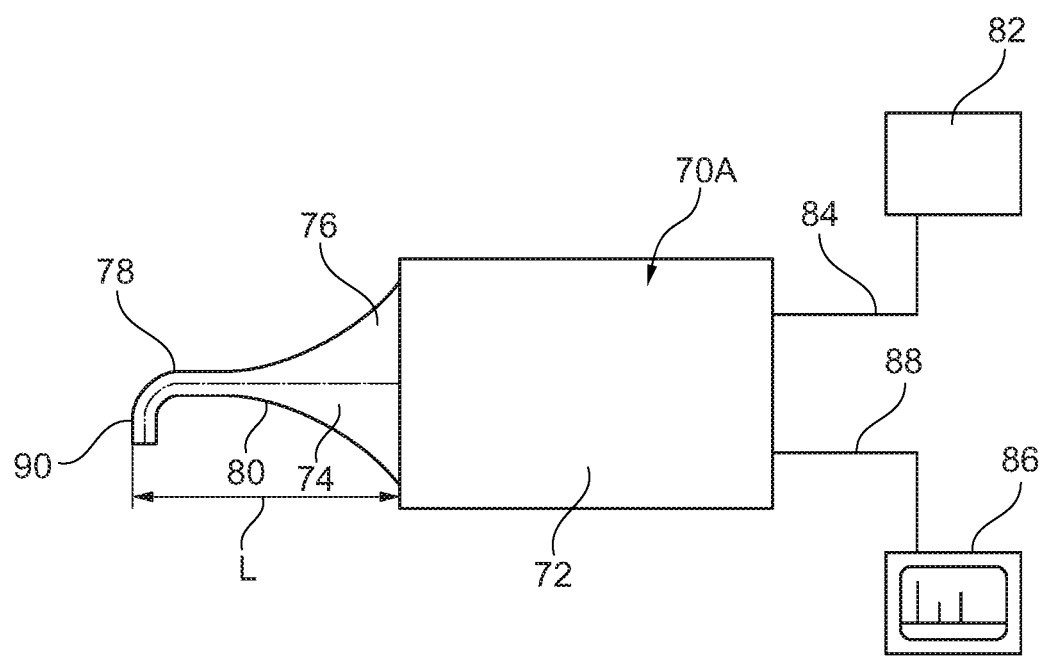
FIG. 7 is a schematic showing an alternative apparatus for ultrasonically inspecting a component according to the present disclosure.

A further apparatus 70A for ultrasonically inspecting a component according to the present disclosure is shown in FIG. 7. The apparatus 70A is substantially the same as that shown in FIG. 6 and like parts are denoted by like numerals. The apparatus 70A differs in that the second end 78 of the waveguide 74 has a bend 90. The second end 78 of the waveguide 74 may have a bend 90 greater than 45°. The second end 78 of the waveguide 74 may have a bend 90 greater than 60°. The second end 78 of the waveguide 74 may have a bend 90 of 70°, 80° or 90°. The diameter of the second end 78 of the waveguide 74 is again 0.4 mm. In this example the radius of the bend is 0.55 mm. In this example the second end 78 of the waveguide 74 has a 90° bend 90. The waveguide 74 also converts the longitudinal wave from the transducer 72 into an edge wave mode in the component and translates the longitudinal wave through the angle corresponding to the angle of the bend 90. The edge mode wave may be an antisymmetric flexural edge mode wave.

The apparatus 70A is used to ultrasonically inspect a compressor drum 41, 41A and in particular to ultrasonically inspect a sealing fin 48, 50, 52 or 54 if a side surface, an annular radially extending surface, of a sealing fin 48, 50, 52 or 54 is not accessible directly in an axial direction from the side and instead the side surface, the annular radially extending surface, of a sealing fin 48, 50, 52 or 54 is accessible in a radial direction from the side, e.g. the flat surface at the end of the bend 90 of the second end 78 of the waveguide 74 may be placed against the side surface of a sealing fin 48, 50, 52 or 54, as shown in FIG. 8.

Figure 9:
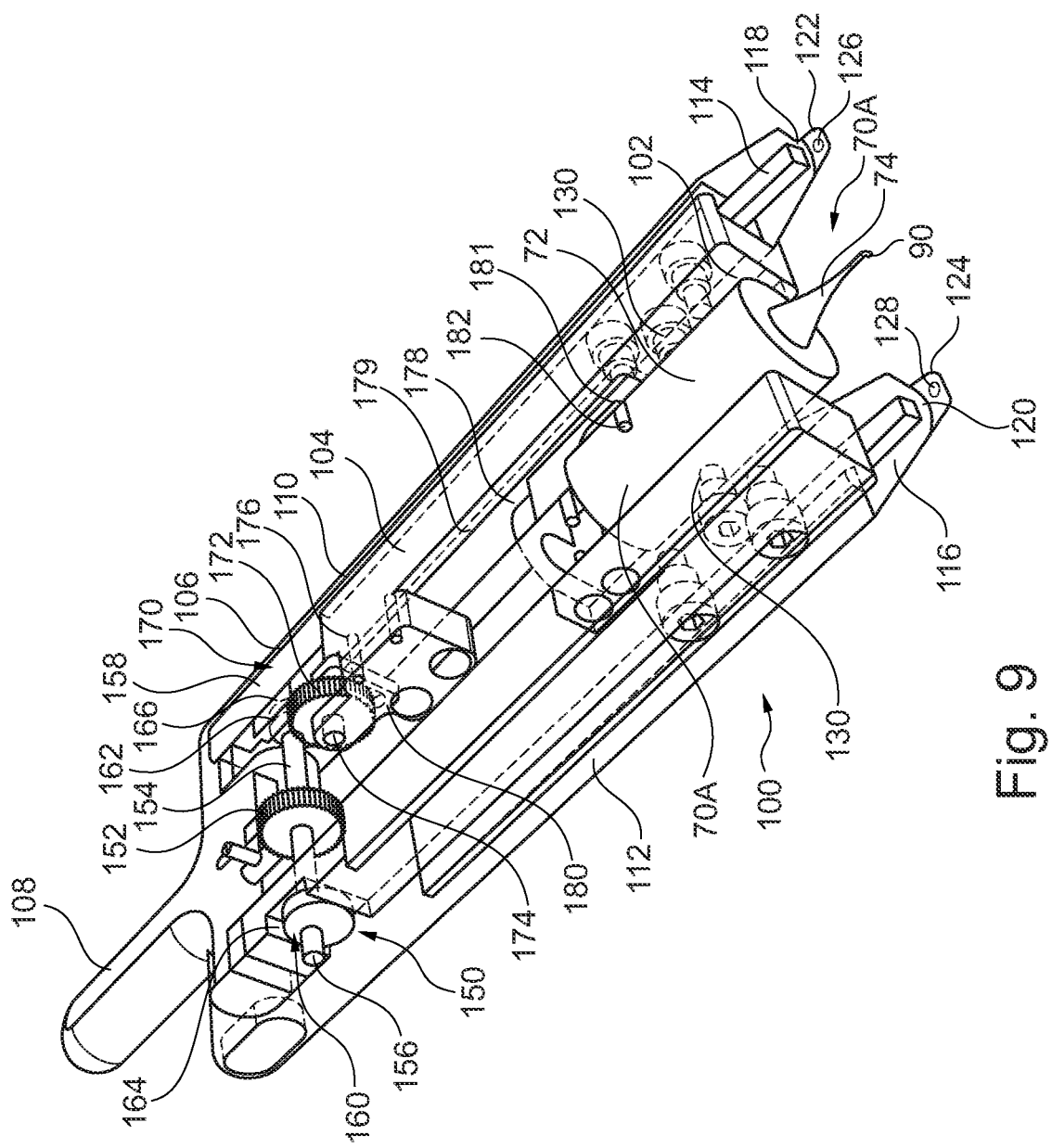
FIG. 9 is an enlarged perspective view of the transducer and waveguide of the apparatus of FIG. 7 in a mounting.

The ultrasonic transducer 72 and the waveguide 74 of the apparatus 70A are conveniently provided in a mounting arrangement 100 as shown in FIG. 9. The mounting arrangement 100 comprises a holder 102, a carrier 104 and a frame 106. The ultrasonic transducer 72 and the waveguide 74 are fixedly mounted in the holder 102, the holder 102 is movably mounted, e.g. pivotally mounted, in the carrier 104 and the carrier 104 is movably mounted, e.g. slidably mounted, in the frame 106.

The frame 106 is generally U-shape and the frame has a handle 108. The frame 106 comprises two parallel limbs 110 and 112 and each limb 110 and 112 has a track upon which the carrier 104 is movably mounted, e.g. slidably mounted. The mounting arrangement 100 has a first mechanism 150 to adjust the position of the carrier 104 longitudinally along the tracks of the limbs 110, 112 of the frame 106 to adjust the position of the carrier 104 in a direction parallel to the limbs 110 and 112 of the of the frame 106. The first mechanism 150 to adjust the position of the carrier 104 along the tracks of the limbs 110, 112, of the frame 106 comprises a knurled wheel 152 fixedly mounted on a cylindrical member 154. The opposite ends 156 and 158 of the cylindrical member 154 are rotatably mounted in the frame 106 and the axis of the cylindrical member 154 is arranged perpendicular to the limbs 110, 112 of the frame 106. A pair of cams 160 and 162 is eccentrically mounted on the cylindrical member 154 and the cams 160 and 162 are located in recesses 164 and 166 respectively in the carrier 104 and the cams 160 and 162 abut the carrier 104. Rotation of the knurled wheel 152 produces rotation of the cylindrical member 154 and hence causes the carrier 104 to move longitudinally relative to the frame 106 due to the cams 160 and 162 on the cylindrical member 154 acting on the longitudinally spaced sides of the recesses 164 and 166 of the carrier 104. The carrier 104 is moved longitudinally relative to the frame 106 to accommodate different diameters of the sealing fin 48, 50, 52 or 54.

The remote end 114, 116 of each limb 110, 112 respectively of the frame 106 has a part cylindrical surface 118, 120. The axis of the part cylindrical surface 118, 120 of each limb 110, 112 is perpendicular to the length of the limb 110, 112 and perpendicular to a direction between the limbs 110, 112. The remote end 114, 116 of each limb 110, 112 of the frame 106 has a projection 122, 124 respectively extending from a first side of the limb 110, 112 and parallel to the limb 110, 112 to form an L-shape with the part cylindrical surface 118, 120 at the remote end 114, 116 of the limb 110, 112, the projections 122 and 124 are arranged in the same plane. Each projection 122, 124 has a part spherical surface 126, 128 respectively.

The holder 102 is mounted on the carrier 104 by a pivotal mount 130. The axis of the pivotal mount 130 is perpendicular to the parallel limbs 110 and 112 of the frame 106. The carrier 104 has a spring to bias the holder 102 against rotation in the first rotational direction. The mounting arrangement 100 has a second mechanism 170 to rotate the holder 102 in a first rotational direction around the pivotal mount 130. The second mechanism 170 to rotate the holder 102 comprises a knurled wheel 172 fixedly mounted on a cylindrical member 174. The opposite ends of the cylindrical member 174 are rotatably mounted in the carrier 104 and the axis of the cylindrical member 174 is arranged perpendicular to the limbs 110, 112 of the frame 106. The knurled wheel 172 also has a cylindrical rod 176 arranged parallel to the axis of the cylindrical member 174 and eccentrically mounted on one face of the knurled wheel 172. A slider 178 is arranged in a track 179 in the carrier 104, a first end of the slider 178 has a U-shaped member 180 and the second end of the slider 178 has an angled surface 181. The cylindrical rod 176 locates in the recess defined by the U-shaped member 180 and the holder 102 has a pin 182 arranged to abut the angled surface 181 on the second end of the slider 178. The spring acts on the opposite side of the holder 102 and the other limb 112. The knurled wheel 172 is rotated to cause the slider 178 to move longitudinally along the carrier 104 and hence the angled surface 181 acts on the pin 182 on the holder 102 to cause the holder 102 to pivot about the pivotal mount 130 in the frame 104 to move the second end 78 of the waveguide 74 out of contact with the sealing fin 48, 50, 52 or 54 and the spring is provided to ensure that a good, repeatable contact between the second end 78 of the waveguide 74 and the sealing fin 48, 50, 52 or 54.

In a method of ultrasonically inspecting a component the apparatus 70 as shown in FIG. 6 or the apparatus 70A as shown in FIG. 7 may be used to ultrasonically inspect the component. The second end 78 of the waveguide 74 is arranged adjacent to and abutting the surface of the component. An ultrasonic signal is transmitted from the ultrasonic transducer 72 through the waveguide 74 into the component and the ultrasonic signal in the component is detected using the waveguide 74 and ultrasonic transducer 72. The ultrasonic transducer 72 and the waveguide 74 are operated in pulse-echo. In more detail the signal generator 82 supplies an electrical signal to the ultrasonic transducer 72 so that the ultrasonic signal is transmitted from the ultrasonic transducer 72 through the waveguide 74 into the component. The ultrasonic signal in the component is detected using the waveguide 74 and ultrasonic transducer 72 and the ultrasonic transducer 72 supplies an electrical signal to the monitor 86. The monitor 86 displays the ultrasonic signal transmitted into the component and the ultrasonic signal received by the transducer 72 after it has passed though, or around, the component and back through the waveguide 74 to the transducer 72 and the ultrasonic signal reflected back from a crack, or other defect, in the component and through the waveguide 74 back to the transducer 72. The procedure is repeated at least once in a different position so that the location of any crack, or other defect, in the component may be accurately located. The method comprises converting a longitudinal wave in the ultrasonic transducer 72 to an edge mode wave at the second end 78 of the waveguide 74. The method comprises allowing longitudinal waves, allowing edge mode waves and reducing other wave modes in the waveguide 74. The geometry of the waveguide 74, e.g. the concave surface 80, suppresses reverberations in the waveguide 74. The edge mode wave may be an antisymmetric flexural edge mode wave.

In particular in the method of ultrasonically inspecting a component the ultrasonic transducer 72 and the waveguide 74 of the apparatus 70A are conveniently provided in the mounting arrangement 100 as shown in FIG. 9 in order for the second end 78 of the waveguide 74 to be placed against the side of an annular sealing fin 48, 50, 52 or 54 as shown in FIG. 8. The length of the frame 106 is selected so that the handle 108 and/or the hand or hands of an inspector conducting an ultrasonic inspection of the sealing fins 48, 50, 52 and 54 is spaced radially and axially away from the blades 56, 58 and 60 so that the hand or hands of the inspector are not damaged, or hurt, during the ultrasonic inspection. Also the knobs to operate the mechanisms are located so that the hand or hands of the inspector are not damaged, or hurt, during the ultrasonic inspection.

The part cylindrical surfaces 118, 120 at the remote ends 114, 116 of the limbs 110, 112 of the frame 106 are abutted against the radially outer end surface of an annular sealing fin 48, 50, 52 or 54 to ensure that the waveguide 74 is arranged radially with respect to the annular sealing fin 48, 50, 52 or 54. The part spherical surfaces 126, 128 on the projections 122, 124 at the remote ends 114, 116 of the limbs 110, 112 of the frame 106 are abutted against a first radial side surface of the annular sealing fin 48, 50, 52 or 54 allows the frame 106 to pivot.

The first mechanism 150 allows controlled movement of the carrier 104, the holder 102, the transducer 72 and the waveguide 74 along the tracks on the limbs 110, 112 of the frame 106 towards, or away, from the annular sealing fin 48, 50, 52 or 54 to accommodate different diameters of the annular sealing fins 48, 50, 52 or 54. The second mechanism 170 allows controlled movement of the holder 102, the transducer 72 and the waveguide 74 around the pivot so that the second end 78 of the waveguide 74 abuts a second radial side surface of the annular sealing fin 48, 50, 52 or 54 to enable the waveguide 74 to transmit an ultrasonic signal with sufficient acoustic energy into the annular sealing fin 48, 50, 52 or 54 to conduct the ultrasonic inspection of the annular sealing fin 48, 50, 52 or 54 and prevents, or restricts, the waveguide 74 slamming into the annular sealing fin 48, 50, 52 or 54 and hence prevents damage to the waveguide 74 and the annular sealing fin 48, 50, 52 or 54 or any coating on the annular sealing fin 48, 50, 52 or 54.

Thus, the mounting arrangement 100 allows repeated accurate positioning of the second end 78 of the waveguide 74 on a side surface of the annular sealing fin 48, 50, 52 or 54 so as to transmit the ultrasonic signal into the annular sealing fin 48, 50, 52 or 54 and in particular to transmit the ultrasonic signal into a remote end of the annular sealing fin 48, 50, 52 or 54.

The component may comprise a turbine disc, a turbine drum, a compressor disc 42, 44 or 46, a compressor drum 41 or 41A or shaft 26, 27 or 36. The component may comprise an annular sealing fin on the turbine disc, an annular sealing fin on the turbine drum, an annular sealing fin on a compressor disc, an annular sealing fin 48, 50, 52 or 54 on a compressor drum 41 or 41A or an annular sealing fin on a shaft 26, 27 or 36. The annular sealing fin 48, 50, 52 or 54 may have a coating. The annular sealing fin may extend radially, or axially, from a turbine disc, a turbine drum, a compressor disc 42, 44 or 46 or a compressor drum 41 or 41A and the annular sealing fin may extend radially from a shaft 26, 27 or 36. The coating may be an abrasive material.

An apparatus for ultrasonically inspecting a component, the apparatus comprising an ultrasonic transducer, a waveguide and an acoustic damper, the waveguide having a first end, a second end and a surface, the waveguide being circular in cross-section, the waveguide reducing in diameter from the first end to the second end, the length of the waveguide being equal to the wavelength of the ultrasonic signal at the centre frequency required for the ultrasonic inspection, the ultrasonic transducer being acoustically coupled to the first end of the waveguide and the second end of the waveguide being arranged adjacent to the component in use, the acoustic damper being arranged in acoustic contact with the surface of the waveguide.

Figure 10:
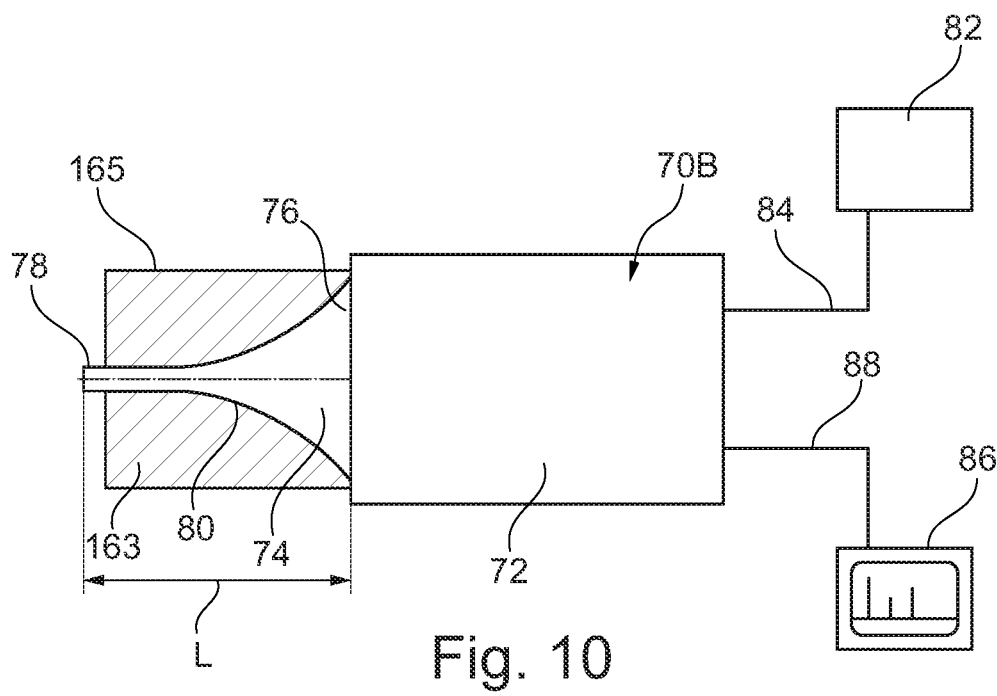
FIG. 10 is a schematic showing a further apparatus for ultrasonically inspecting a component according to the present disclosure.
Figure 11:
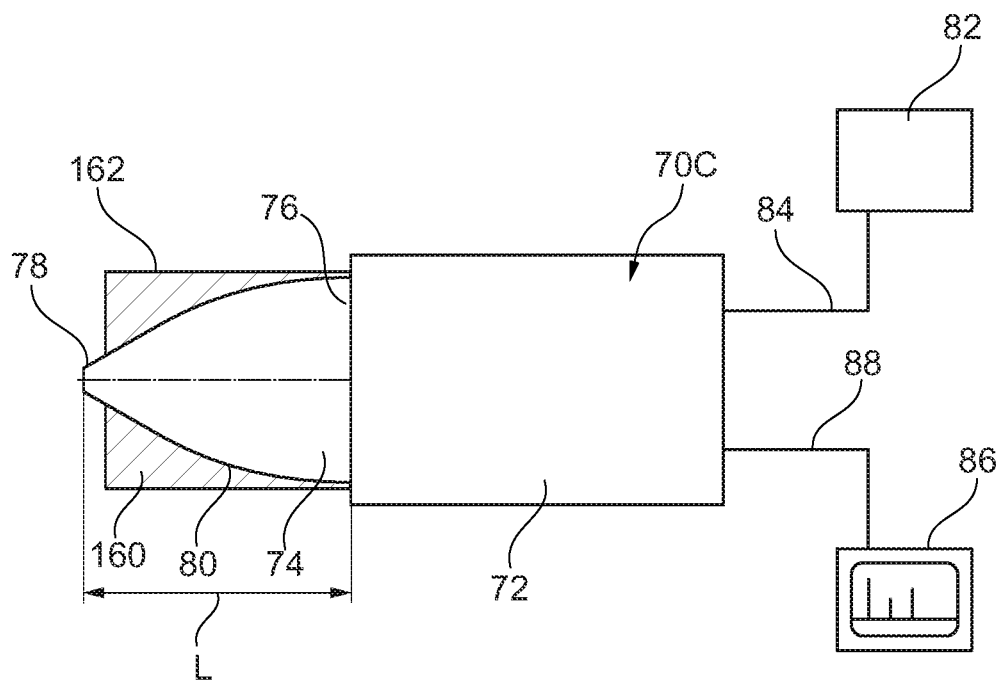
FIG. 11 is a schematic showing an additional apparatus for ultrasonically inspecting a component according to the present disclosure.
Figure 12:
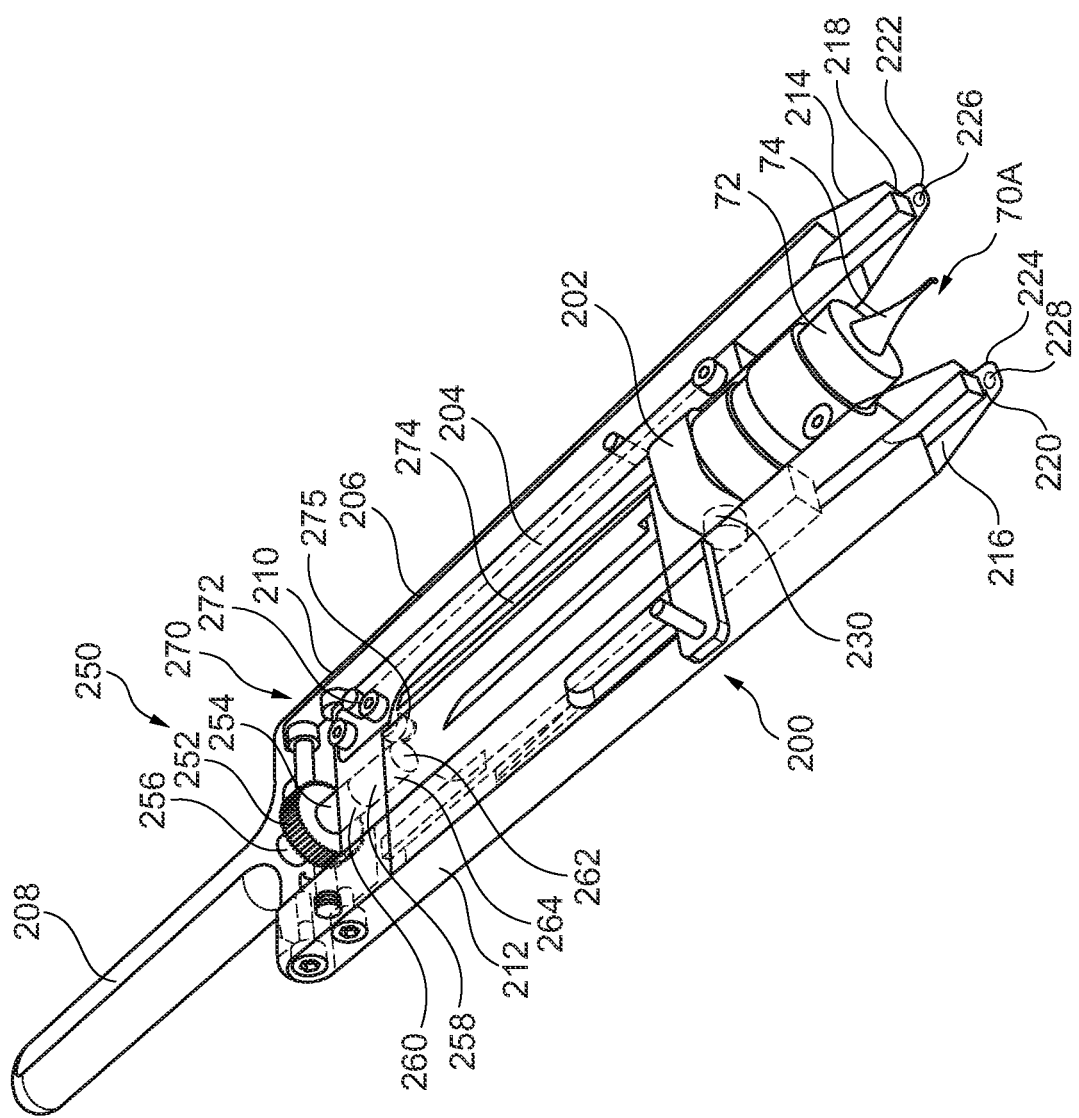
FIG. 12 is an enlarged perspective view of the transducer and waveguide of the apparatus of FIG. 7 in an alternative mounting.

FIGS. 10, 11 and 12 show three alternative apparatus for ultrasonically inspecting a component according to the present disclosure.

FIG. 10 shows an apparatus 70B similar to FIG. 6 and like parts are denoted by like numerals. FIG. 10 differs in that an acoustic damper 163 is arranged in acoustic contact with the surface 80 of the waveguide 74. The acoustic damper 163 comprises a viscoelastic material, a suitable acoustic damper is STOPAQ® (2017d). The acoustic damper 163 is enclosed by a casing or sheath 165. The acoustic damper 163 suppresses the reverberations in the waveguide 74.

FIG. 11 shows an apparatus 70C similar to FIG. 6 and like parts are denoted by like numerals. FIG. 12 differs in that the surface 80B of the waveguide 74 between the first end 76 and the second end 78 is convex and an acoustic damper 160 is arranged in acoustic contact with the surface 80B of the waveguide 74. The acoustic damper 163 comprises a viscoelastic material, a suitable acoustic damper is STOPAQ® (2017d). The acoustic damper 163 is enclosed by a casing or sheath 165. The acoustic damper 163 suppresses the reverberations in the waveguide 74.

In a method of ultrasonically inspecting a component the ultrasonic transducer 72 and the waveguide 74 of the apparatus 70A are alternatively provided in an alternative mounting arrangement 200 as shown in FIG. 12 in order for the second end 78 of the waveguide 74 to be placed against the side of an annular sealing fin 48, 50, 52 or 54 as shown in FIG. 8. The mounting arrangement 200 comprises a holder 202, a carrier 204 and a frame 206. The ultrasonic transducer 72 and the waveguide 74 are fixedly mounted in the holder 202, the holder 202 is movably mounted, e.g. pivotally mounted, in the carrier 204 and the carrier 204 is movably mounted, e.g. slidably mounted, in the frame 206.

The frame 206 is generally U-shape and the frame has a handle 208. The frame 206 comprises two parallel limbs 210 and 212 and each limb 210 and 212 has a track upon which the carrier 204 is movably mounted, e.g. slidably mounted. The mounting arrangement 200 has a first mechanism 250 to adjust the position of the carrier 204 longitudinally along the tracks of the limbs 210, 212 of the frame 206 to adjust the position of the carrier 204 in a direction parallel to the limbs 210 and 212 of the of the frame 206. The first mechanism 250 to adjust the position of the carrier 204 along the tracks of the limbs 210, 212, of the frame 206 comprises a knurled wheel 252 fixedly mounted on a cylindrical member 254. A first end 256 of the cylindrical member 254 is rotatably mounted in the frame 206 and the axis of the cylindrical member 254 is arranged parallel to the limbs 210, 212 of the frame 206. The second end 258 of the cylindrical member 254 has a threaded external surface 260 which is arranged to locate in an internally threaded surface 264 of a cylindrical bore 262 in the carrier 204. Rotation of the knurled wheel 252 produces rotation of the cylindrical member 254 and hence causes the carrier 204 to move longitudinally relative to the frame 206 due to the threaded external surface 260 and the internally threaded surface 264 on the cylindrical member 254 and the cylindrical bore 262 respectively. The carrier 204 is moved longitudinally relative to the frame 206 to accommodate different diameters of the sealing fin 48, 50, 52 or 54.

The remote end 214, 216 of each limb 210, 212 respectively of the frame 206 has a part cylindrical surface 218, 220. The axis of the part cylindrical surface 218, 220 of each limb 210, 212 is perpendicular to the length of the limb 210, 212 and perpendicular to a direction between the limbs 210, 212. The remote end 214, 216 of each limb 210, 212 of the frame 206 has a projection 222, 224 respectively extending from a first side of the limb 210, 212 and parallel to the limb 210, 212 to form an L-shape with the part cylindrical surface 218, 220 at the remote end 214, 216 of the limb 210, 212, the projections 222 and 224 are arranged in the same plane. Each projection 222, 224 has a part spherical surface 226, 228 respectively.

The holder 202 is mounted on the carrier 204 by a pivotal mount 230. The axis of the pivotal mount 230 is perpendicular to the parallel limbs 210 and 212 of the frame 206. The mounting arrangement 200 has a second mechanism 270 to rotate the holder 202 in a first rotational direction around the pivotal mount 230. The second mechanism 270 comprises a button 272 mounted in the carrier 204 and the button 272 is connected by a lever 274 to the pivotal mount 230. The carrier 204 also has a spring 275 to bias the button 272 against rotation in a first rotational direction. The button 272 is depressed to cause the holder 202 to pivot in the frame 206 to move the second end 78 of the waveguide 74 out of contact with the sealing fin 48, 50, 52 or 54 and the spring 275 is provided to ensure that a good, repeatable contact between the second end 78 of the waveguide 74 and the sealing fin 48, 50, 52 or 54 is achieved when pressure on the button 272 is released.

The mounting arrangement 200 is simpler than the mounting arrangement 100. The first mechanism 250 of the mounting arrangement 200 has a greater range of longitudinal movement of the carrier relative to the frame than the first mechanism 150 of the mounting arrangement 100. The second mechanism 270 of the mounting arrangement 200 provides feedback of the force applied to an operator whereas the second mechanism 170 of the mounting arrangement 100 ensured the waveguide did not slam into the component.

Figure 13:
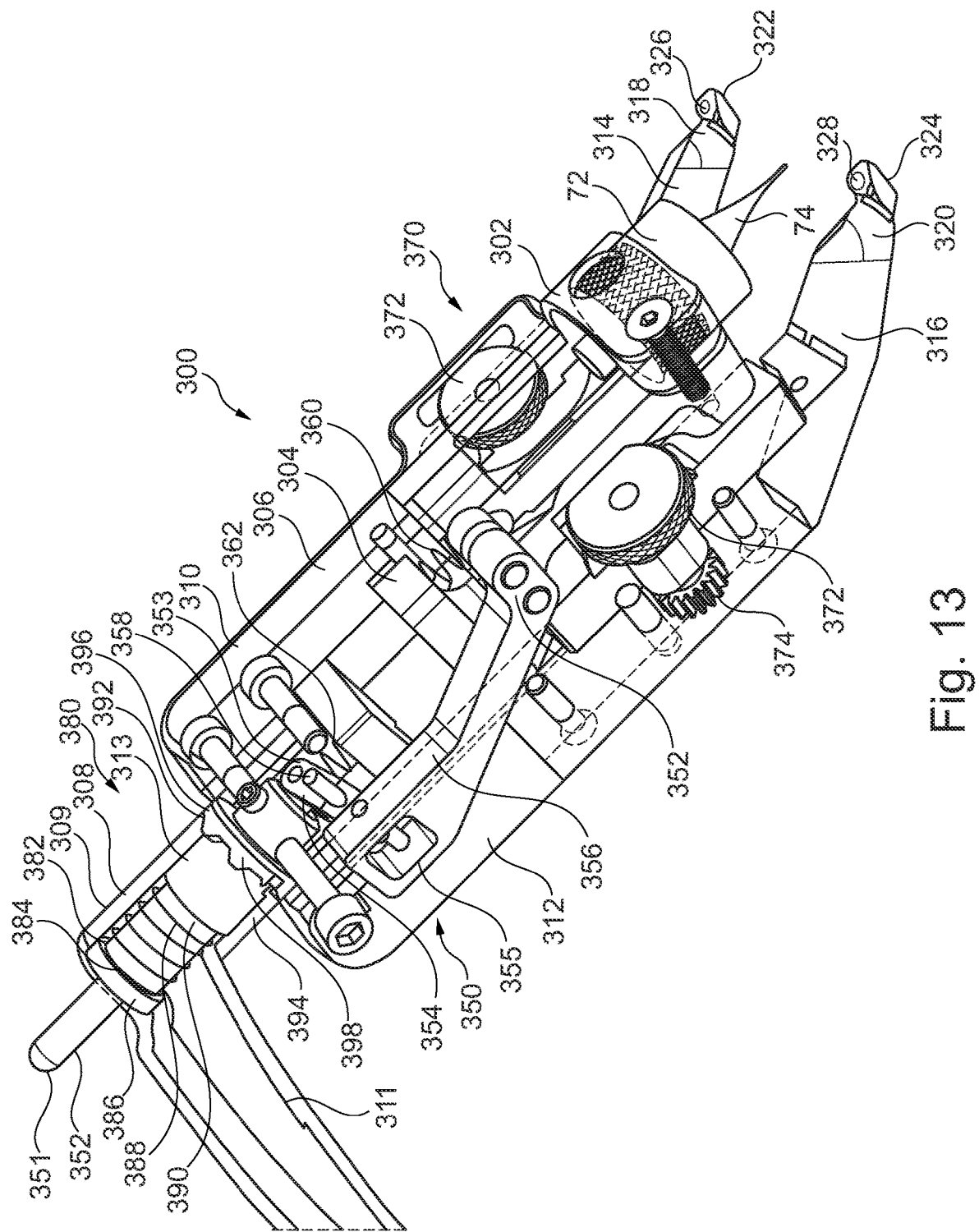
FIG. 13 is an enlarged perspective view of the transducer and waveguide of the apparatus of FIG. 6 in a mounting.
Figure 14:
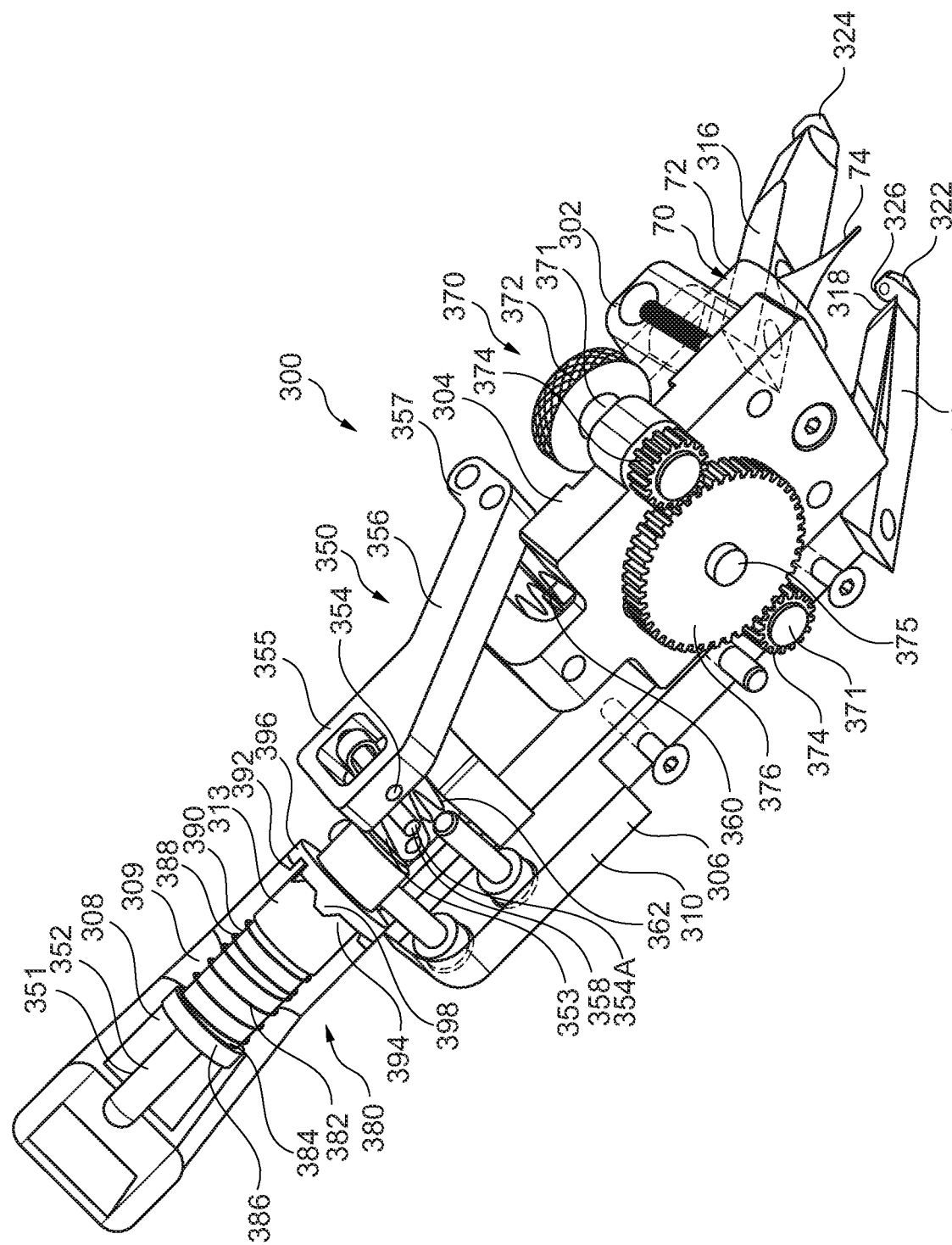
FIG. 14 is cut away enlarged perspective view of the transducer and waveguide of the apparatus of FIG. 6 in the mounting of FIG. 13.
Figure 15:
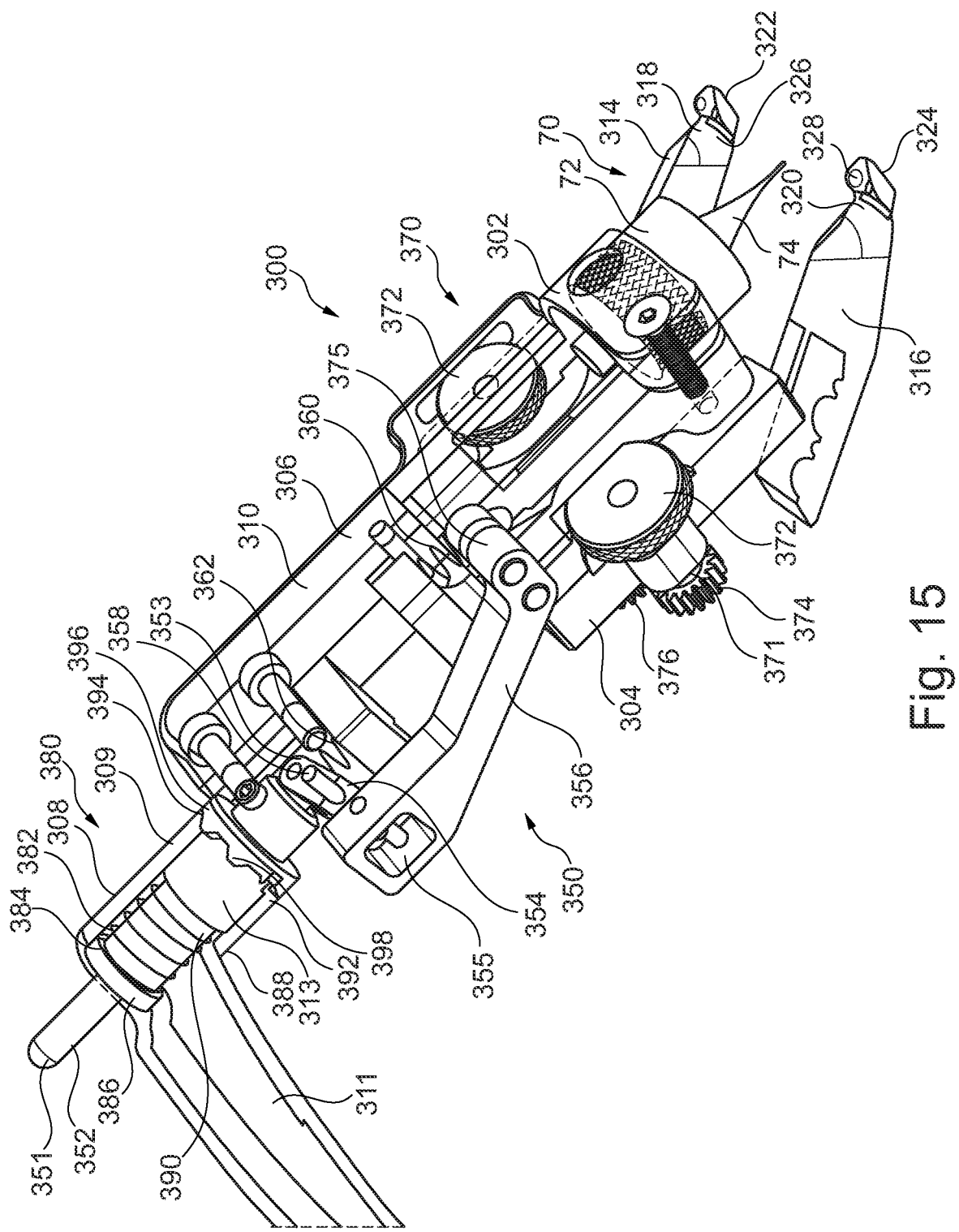
FIG. 15 is another cut away enlarged perspective view of the transducer and waveguide of the apparatus of FIG. 6 in the mounting of FIG. 13.

In a method of ultrasonically inspecting a component the ultrasonic transducer 72 and the waveguide 74 of the apparatus 70 are provided in a mounting arrangement 300 as shown in FIGS. 13, 14 and 15 in order for the second end 78 of the waveguide 74 to be placed against the side of an annular sealing fin 48, 50, 52 or 54 as shown in FIG. 8. The mounting arrangement 300 comprises a holder 302, a carrier 304 and a frame 306. The ultrasonic transducer 72 and the waveguide 74 are fixedly mounted in the holder 302, the holder 302 is movably mounted in the carrier 304 and the carrier 304 is movably mounted in the frame 306.

The frame 306 is generally U-shape and the frame has a handle 308. The frame comprises two parallel limbs 310 and 312. The handle 308 comprises a generally cylindrical portion 309 and an arm portion 311 extending radially from the generally cylindrical portion 309. The generally cylindrical portion 309 is hollow and is mounted coaxially on a cylindrical portion 313 of the frame 306 which extends from a main portion of the frame 306. The cylindrical portion 313 of the frame 306 is also hollow. The holder 302 is movably mounted on the carrier 304 such that the holder 302 is movable longitudinally relative to the frame 306, e.g. parallel to the limbs 310, 312 of the frame 306, but the carrier 304 is fixed longitudinally relative to the frame 306. The carrier 304 is located in slots in the limbs 310, 312 and the slots prevent longitudinal movement of the carrier 304 but allow movement perpendicular to the longitudinal direction of the limbs 310, 312. The carrier 304 is movably mounted on the frame 306 such that the carrier 304 is movable in a direction perpendicular to a plane containing the parallel limbs 310, 312 of the frame 306.

The mounting arrangement 300 has a first mechanism 350 to adjust the position of the holder 302 longitudinally relative to the limbs 310, 312 of the frame 306. The first mechanism 350 to adjust the position of the holder 302 relative to the limbs 310, 312 of the frame 306 comprises a button 352 arranged coaxially within the cylindrical portion 313 of the frame 306. A first end 351 of the button 352 protrudes out of the remote end of the generally cylindrical portion 309 of the handle 308 and a second end 353 of the button 352 protrudes out of the cylindrical portion 313 of the frame 306. The second end 353 of the button 352 is pivotally connected to a first end of a linkage 354. The second end of the linkage 354 is pivotally connected to a first end 355 of a second linkage 356 and a second end 357 of the second linkage 356 is connected to the holder 302. The linkage 354 is pivotally mounted 358 to the frame 306. A spring, e.g. a coil spring, 360 is provided between the adjacent ends of the holder 302 and the carrier 304. A spring, e.g. a coil spring 362, is provided between the second end 353 of the button 352 and a surface of the frame 306. In operation the button 352 is pressed to cause the button 352 to move against the spring 362 to cause the linkage 354 to pivot about the pivotal mount 358 and hence cause the second linkage 356 to pull the holder 302 against the spring 360 further towards the centre of the frame 306 and hence away from the component. The holder 302 is moved longitudinally relative to the frame 306 to move the second end 78 of the waveguide 74 out of contact with the sealing fin 48, 50, 52 or 54. The springs 360 is provided to ensure that a good, repeatable contact between the second end 78 of the waveguide 74 and the sealing fin 48, 50, 52 or 54 is achieved when pressure on the button 352 is released.

The remote end 314, 316 of each limb 310, 312 respectively of the frame 306 has a part cylindrical surface 318, 320. The axis of the part cylindrical surface 318, 320 of each limb 310, 312 is perpendicular to the length of the limb 310, 312 and perpendicular to a direction between the limbs 310, 312. The end 314, 316 of each limb 310, 312 of the frame 306 is cranked at a suitable angle and the remote end has a projection 322, 324 respectively extending from a first side of the limb 310, 312 and parallel to the limb 310, 312 to form an L-shape with the part cylindrical surface 318, 320 at the remote end 314, 316 of the limb 310, 312, the projections 322 and 324 are arranged in the same plane. Each projection 322, 324 has a part spherical surface 326, 328 respectively.

The mounting arrangement 300 has a second mechanism 370 to adjust the position of the carrier 304 in a direction perpendicular to a plane containing the parallel limbs 310, 312 of the frame 306. The second mechanism 370 to adjust the position of the carrier 304 in a direction perpendicular to a plane containing the parallel limbs 310, 312 of the frame 306 comprises a pair of knurled wheels 372. Each knurled wheel 372 is mounted on an associated coaxial spindle 371 and each spindle 371 has a coaxial gear 374. Each spindle 371 extends through an associated aperture (not shown) in the carrier 304. The axes of the knurled wheels 372 are arranged parallel to each other and each of the gears 374 meshes, at diametrically opposite locations, with a further gear 376. The further gear 376 is mounted on a threaded spindle 375 and the threaded spindle 375 is located in a threaded aperture (not shown) in the carrier 304. In operation rotation of one of the knurled wheels 372 produces rotation of the associated gear 374 and the further gear 376 and threaded spindle 375 and hence movement of the carrier 304 in a direction perpendicular to a plane containing the parallel limbs 310, 312 of the frame 306 to accommodate different diameters of the sealing fin 48, 50, 52 or 54. The use of two knurled wheels 372 and associated spindles 371 and gears 374 enables the position of the carrier 304 to be adjusted by either knurled wheel 372 and provides a more balanced system. However, it is equally possible to simply provide a single knurled wheel 372 with an associated spindle 371 and gear 374 to drive the further gear 376 and threaded spindle 375.

The mounting arrangement 300 has a third mechanism 380 to allow the handle 308 to be rotated to different positions to enable an operator to have a comfortable grip when the ultrasonic transducer 72, the waveguide 74 of the apparatus 70 in the mounting arrangement 300 are in different positions relative to the sealing fin 48, 50, 52 or 54. The third mechanism 380 comprises a spring, e.g. a coil spring, 382 located around the cylindrical portion 313 of the frame 306. A first end 384 of the spring 382 abuts an annular radially outwardly extending flange 386 at a remote end of the cylindrical portion 313 of the frame 306 and a second end 388 of the spring 382 abuts an annular radially inwardly extending flange 390 on the cylindrical portion 309 of the handle 308. The generally cylindrical portion 309 of the handle 308 has axially extending circumferentially spaced teeth 392 at an end 394 adjacent to the main portion of the frame 306 and the cylindrical portion 313 of the frame 306 has an annular radially outwardly extending flange 396 adjacent to the main portion of the frame 306 and the annular radially outwardly extending flange 396 also has axially extending circumferentially spaced teeth 398 arranged to interdigitate with the axially extending circumferentially spaced teeth 392 on the generally cylindrical portion 309 of the handle 308. In operation the handle 308 is unlocked, pulled away, from the frame 306 against the spring 382 to enable the axially extending teeth 392 and 398 to become disengaged and the handle 308 is rotatable around the cylindrical portion 313 of the frame 306 to a required angular position. The handle 308 is then locked in position relative to the frame 306 by allowing the spring 382 to return to a position in which the axially extending teeth 392 and 398 are engaged.

Although the present disclosure has referred to an ultrasonic transducer with a centre frequency of 1 MHz and an ultrasonic transducer with a centre frequency of 2.25 MHz it may be possible to use an ultrasonic transducer with a centre frequency equal to or greater than 0.5 MHz and equal to or less than 3 MHz. It may be possible to use an ultrasonic transducer with a centre frequency equal to or greater than 0.5 MHz and equal to or less than 2.25 MHz. The ultrasonic transducer may have a centre frequency equal to or greater than 0.5 MHz and equal to or less than 1 MHz.

Although the present disclosure has referred to a waveguide with a length equal to the wavelength of the ultrasonic signal at the centre frequency required for the ultrasonic inspection it may be possible for the length of the waveguide to be equal to or greater than 0.5 times and equal to or less than 3 times the wavelength of the ultrasonic signal at the centre frequency required for the ultrasonic inspection, Advantages of the present disclosure compared to the elongate connector disclosed in EP 3171166 A1 are that the waveguide is much shorter than the elongate connector, the waveguide suppresses reverberations within the waveguide and permits pulse-echo operation with an associated ultrasonic transducer.

Although the present disclosure has referred to the ultrasonic inspection of an annular sealing fin it may be equally possible to ultrasonically inspect other annular members which project from a component, for example an annular component, a cylindrical component or a disc component, for example an annular flange extending radially or an annular flange extending axially from the component.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An apparatus for ultrasonically inspecting a component of a gas turbine engine at a centre frequency required for ultrasonic inspection of the component, the apparatus comprising:
   an ultrasonic transducer and a waveguide;
   wherein the ultrasonic transducer and the waveguide are mounted in a holder, the holder is movably mounted in a carrier, and the carrier is movably mounted in a frame;
   wherein the waveguide has a first end, a second end and a surface, the waveguide is circular in cross-section, the surface of the waveguide between the first end and the second end is concave, and the waveguide reduces in diameter from the first end to the second end, the length of the waveguide being equal to or greater than 0.5 times and equal to or less than 3 times the wavelength of an ultrasonic signal at the centre frequency required for the ultrasonic inspection; and
   wherein the ultrasonic transducer is acoustically coupled to the first end of the waveguide and the second end of the waveguide is arranged adjacent to the component in use.

2. The apparatus of claim 1, wherein the surface of the waveguide between the first end and the second end is parabolic.

3. The apparatus of claim 1, wherein the waveguide comprises a metal.

4. The apparatus of claim 1, wherein the ultrasonic transducer has a centre frequency of 1 MHz, or the ultrasonic transducer has a centre frequency of 2.25 MHz.

5. The apparatus of claim 1, further comprising a band-pass filter of 400 kHz to 600 kHz.

6. The apparatus of claim 1, wherein the second end of the waveguide has a diameter of 0.4 mm, the first end of the waveguide has a diameter of 6 mm and the waveguide has a length of 12 mm.

7. The apparatus of claim 1, wherein the second end of the waveguide has a bend.

8. The apparatus of claim 7, wherein the second end of the waveguide has a bend greater than 45°.

9. The apparatus of claim 1, further comprising a signal generator arranged to send a signal to the ultrasonic transducer.

10. The apparatus of claim 9, wherein the signal generator is arranged to provide a signal with a centre frequency of 500 kHz, the signal has an amplitude of 400 to 800 V peak to peak, and the signal is a 5 cycle tone burst.

11. The apparatus of claim 10, wherein the signal generator has a pulse repetition rate of 15 Hz and a time base of 1000 μs.

12. The apparatus of claim 1, wherein the frame is generally U-shaped.

13. The apparatus of claim 12, wherein the frame comprises two parallel limbs and each limb has a track upon which the carrier is movably mounted.

14. The apparatus of claim 13, wherein a remote end of each limb of the frame has a part cylindrical surface, and an axis of the part cylindrical surface of each limb is perpendicular to the length of the limb and perpendicular to a direction between the limbs.

15. The apparatus of claim 14, wherein a remote end of each limb of the frame has a projection that extends from a first side of the limb and is parallel to the limb to form an L-shape with the part cylindrical surface at the remote end of the limb, the projections are arranged in the same plane, and each projection has a part spherical surface.

16. The apparatus of claim 1, wherein the frame has a first mechanism to adjust the position of the carrier along the limbs of the frame.

17. The apparatus of claim 1, wherein the carrier has a second mechanism to rotate the holder in a first rotational direction around a pivotal mount, and the carrier has a spring to bias the holder against rotation in the first rotational direction.

18. A method of ultrasonically inspecting a component of a gas turbine engine, the method comprising the steps of:
   (a) providing an apparatus according to any preceding claim for ultrasonically inspecting a component of a gas turbine engine at a centre frequency required for ultrasonic inspection of the component, the apparatus comprising an ultrasonic transducer and a waveguide, the waveguide having a first end, a second end and a surface, the waveguide being circular in cross-section, the waveguide reducing in diameter from the first end to the second end, the length of the waveguide being equal to or greater than 0.5 times and equal to or less than 3 times the wavelength of an ultrasonic signal at the centre frequency required for the ultrasonic inspection, the ultrasonic transducer being acoustically coupled to the first end of the waveguide;

(b) arranging the second end of the waveguide adjacent to the component;

(c) transmitting an ultrasonic signal from the ultrasonic transducer through the waveguide into the component; and (d) detecting the reflected ultrasonic signal in the component using the waveguide and ultrasonic transducer.

19. The method of claim 18, wherein the component comprises a turbine disc, a turbine drum, a compressor disc, a compressor drum, or a shaft.

20. The method of claim 18, further comprising converting a longitudinal wave in the ultrasonic transducer to an edge mode wave at the second end of the waveguide.

* * * * *